United States Patent [19]

Reich

[11] 4,347,807
[45] Sep. 7, 1982

[54] CAT CONDOMINIUM AND METHOD OF MAKING SAME

[76] Inventor: Marvin Reich, 1407 G St. NW., 3rd Floor, Washington, D.C. 20005

[21] Appl. No.: 244,555

[22] Filed: Mar. 17, 1981

[51] Int. Cl.³ .............................................. A01K 1/03
[52] U.S. Cl. ...................................... 119/19; 119/29
[58] Field of Search .................. 119/1, 15, 19, 29; 272/113; 217/13, 16; 220/7

[56] References Cited

U.S. PATENT DOCUMENTS

| D. 224,686 | 8/1972 | Michlap et al. | 119/1 X |
| 1,754,590 | 4/1930 | Allen | 119/19 X |
| 2,002,259 | 5/1935 | Cole | 119/19 |
| 2,240,256 | 4/1941 | Elmendorf | 217/16 X |
| 2,723,853 | 11/1955 | Rees | 272/113 X |
| 3,223,270 | 12/1965 | Lindley | 217/16 |
| 3,391,848 | 7/1968 | Schmidt | 217/16 X |
| 3,552,356 | 1/1971 | Rosenthal | 119/1 |
| 3,561,757 | 2/1971 | Schillig | 272/113 |
| 3,666,266 | 5/1972 | Noguchi | 272/113 |

Primary Examiner—Gene Mancene
Assistant Examiner—Robert P. Swiatek
Attorney, Agent, or Firm—Marvin Reich

[57] ABSTRACT

A cat condominium which is constructed out of a rigid material such as wood, particle board, pressed wood, metal or the like which is rigid in erected form and collapsible for shipping and storage without the use of hinges or hardware.

10 Claims, 6 Drawing Figures

CAT CONDOMINIUM AND METHOD OF MAKING SAME

BACKGROUND OF THE INVENTION

The invention relates to a cat condominium or cat house and, more particularly, to a cat condominium which is made out of a rigid material such as wood and is disassembled by the removal of the shelves and folded flat for shipping or storage.

DESCRIPTION OF THE PRIOR ART

The prior art condominiums are made out of large cardboard (pasteboard) tubes which are not collapsible, or made out of rigid materials which are nailed, or adhesively bonded together, etc., to form a rigid box which does not collapse for shipping or storage, as manufactured by The Winrub Manufacturing Company of California and the Rightway Post Company of Los Angeles, California.

These prior art condominiums have the carpet covering the unit applied after the rigid unit is made.

OBJECTS OF THE INVENTION

An object of this invention is to manufacture a cat condominium out of rigid materials which is collapsible for shipping and storage.

Still another object of the invention is to provide a cat condominium which is rigid when erected but does not require the manufacture of a rigid box or tube before applying the carpet on the exterior of the unit.

A still further object of the invention is to apply the carpet to the side panels without the edges of the side panels being fixedly connected to each other.

In addition to the foregoing described objects and advantages, additional objects will become apparent as the hereinafter detailed description of the invention is read in conjunction with the accompanying drawings which illustrate the invention.

BRIEF DESCRIPTION OF THE INVENTION

Briefly, the present invention comprises four side panels, each panel being spaced from each other. Also, opposing panels are of equal width so that the unit forms a parallelogram when assembled. The panels are laid flat on a work area with all the bottom parts being on a straight line. A piece of carpet covers one half of the exterior of the first panel and the exterior of the second, third and fourth panels with a piece of carpet left over to come around and cover the remainder of the first panel. The carpet is nailed or stapled on to the panels. At least two of the panels are provided with means to support shelves which are mounted to form one or more levels (floors) for the cats to play on. The mounting means may take the form of ledges attached to the panels and cut-out portions wherein part of the shelf may slip into the side of the panel or, in the case of metal stock, the side may be cut out and bent over to form a support as is common in the metal working arts.

DETAILED DESCRIPTION OF THE PREFERRED EMBODIMENT

Figure 1:
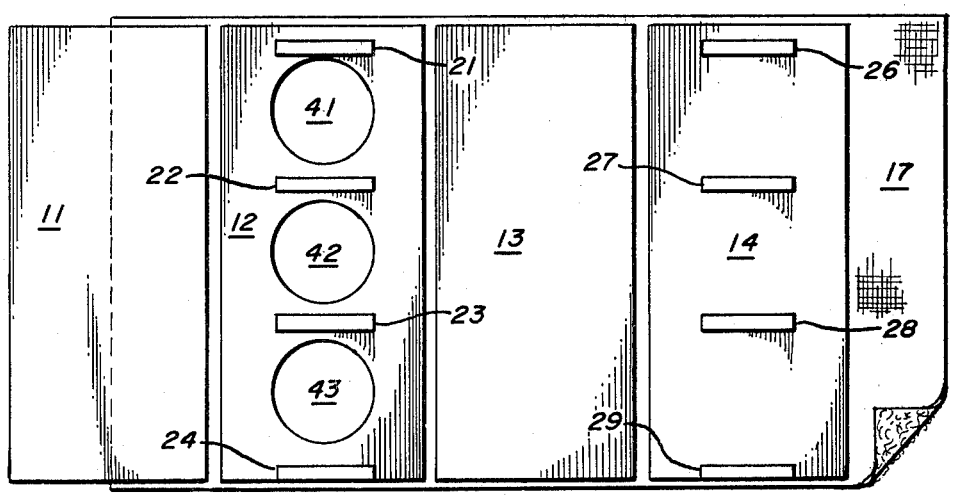
FIG. 1 illustrates four equal panels in a flat mode with the carpet attached to all four panels; the panels being on top of the carpet.
Figure 2:
FIG. 2 illustrates a side view of FIG. 1.
Figure 3:
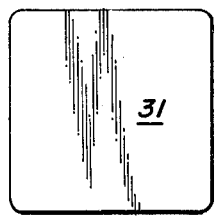
FIG. 3 illustrates a bottom shelf or a shelf which does not permit passage between the compartments that this shelf forms.
Figure 4:
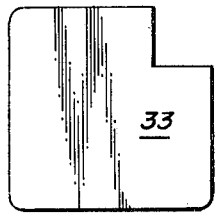
FIG. 4 is a shelf like FIG. 3 which is provided with a corner cut out so that the cat may climb from one level to another without leaving the interior of the condominium.
Figure 5:
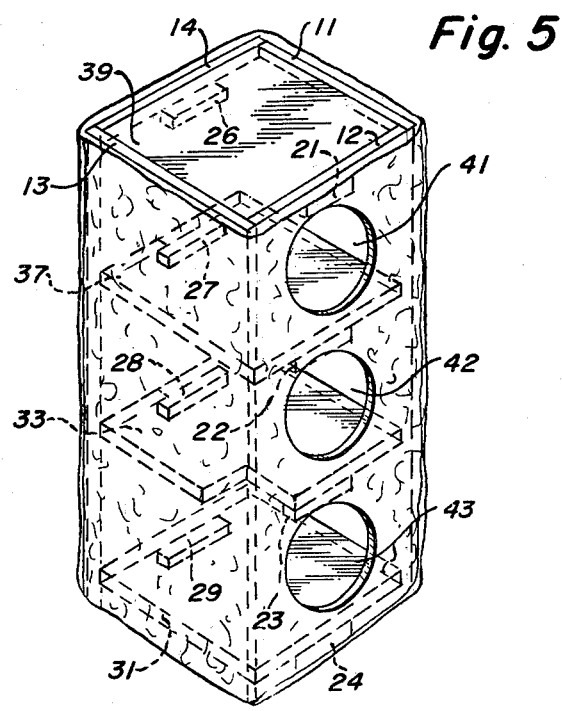
FIG. 5 illustrates the cat condominium in its fully erected position.

Referring to FIG. 1. Panels 11, 12, 13, 14 are all of equal length and width and when erected form a square condominium. However, panels 11 and 13 may be of equal size and of different widths than panels 12 and 14 which are also of equal size and thus, a rectangular condominium is formed.

Mounting means 21, 22, 23, and 24 are attached to panel 12 and mounting means 26, 27, 28, and 29 are attached to panel 14. The mounting means 21, 22, 23, 24, 26, 27, 28 and 29 are ledges in the preferred embodiment but may also be cut-outs to receive part of the shelf to support same and are half-inch thick by ¾ inch wide and about 8 inches long.

Shelf 31 forms the bottom of the completed cat condominium and shelves 33 and 37 form the floors of the second and third compartments, respectively. Shelf 39 forms the top of the completed unit. Each of the shelves 31, 33, 37, and 39 is covered with carpet so as to provide a carpeted floor for the cat's compartment as is customarily provided for in cat condominiums.

Entrances which are shown as round holes but may be of other shapes, such as square, and bearing numerals 41, 42, and 43 are provided for the cat to climb in and out of the front of the unit.

The cat condominium provides cats and kittens with a place to play and hide, a place for the animal to sleep on the carpeted floors and side walls for the cats and kittens to climb on, as well as side walls for scratching.

The panel 12 has holes 41, 42, 43 cut therefrom to create openings for the cat to crawl out of and into the assembled unit.

Ledges 21, 22, 23, and 24 are fixedly connected to panel 12 by adhesive or fastening means, such as nails, screws or bolts. Similarly, ledges 26, 27, 28, and 29 are attached to panel 14.

METHOD OF CONSTRUCTING THE CAT CONDOMINIUM

The panels 11, 12, 13, and 14 are laid out on the work surface after they have been cut from a sheet of half-inch plywood or other suitable material. The tops and bottoms are lined up in alignment to one another so that the bottom edges form a straight line and the top edges form a straight line. The panels are spaced apart from each other by a distance equal to between one and two thicknesses of the panel. For example, with the use of one-half inch plywood for the panel material, the spacing between panels 11 and 12, 12 and 13, 13 and 14, should be between one-half inch and one inch.

A piece of carpet sufficiently long to cover all four panels 11, 12, 13, and 14 is laid on top of panels 12, 13, and 14 and completely covers them. Panel 11, the first panel, is only covered from the middle to one edge. The carpet is fastened to the panels by staples, carpet tacks or adhesive. The carpet flat 17 is then folded around to cover the uncovered half of panel 11.

Figure 6:
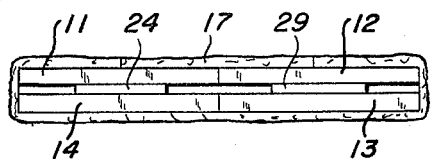
FIG. 6 illustrates the four panels fully attached to the carpet and the condominium being in its collapsed shipping or storage mode.

The unit is now in a box. By laying the box on its side, it can be collapsed into the shape shown in FIG. 6 as the carpet becomes the hinges.

The shelves 31, 33, 37, and 39 are made with rounded corners to facilitate an easy assembly. The top of each shelf is covered with carpet.

The box is stood on one end (bottom down) and the bottom shelf 31 is passed into the unit from the top thereof so as to come to rest on ledges 24 and 29. Similarly, a shelf 33 is passed into the unit to come to rest on ledges 23 and 28. Then shelf 37 or another shelf 33 is passed into the unit to rest on ledges 22 and 27, and finally the top or shelf 39 is placed on ledges 21 and 26. The unit is now constructed and is rigid. The shelves force the panels in this position. The completed unit may be collapsed by removing the shelves.

What is claimed is:

1. A method of making a cat condominium comprising:
    a. placing four panels on a work surface, said four panels being aligned side by side in a horizontal plane,
    b. placing a continuous piece of carpet over said four panels and attaching said carpet to said panels,
    c. erecting said four panels to form a box-shaped structure,
    d. inserting rigid shelf members in a spaced relationship within said erected four panels, so as to form compartments, thereby forming a rigid cat condominium.

2. A method of making a cat condominium as described in claim 1, wherein said panels are spaced from each other by a distance equal to the thickness of said panels.

3. A collapsible and erectable cat condominium comprising four rectangular wall panels, a carpet attached to one face of each panel with said panels being laid out in a row and spaced from one another by a distance equal to their thickness, said carpet extending from the panel at one end of the row and projecting beyond the last panel of the row a distance equal to the uncovered portion of said panel at one end of said row plus an amount equal to the thickness of a panel whereby the panels and attached carpet can be folded into an erected condition to form a box-like body, said projecting portion of the carpet being attached to the uncovered portion of the face of the panel that was at said one end of the row,
    a bottom member and a top member supported within said body so as to define a compartment and a cat accommodating aperture in one panel for providing access to said compartment.

4. A cat condominium as described in claim 3, whereby means are provided for mounting shelves, said shelf mounting means being attached to at least one of said panels.

5. A cat condominium as described in claim 4, said shelf mounting means is attached to opposing panels, and a shelf having one side carpeted, said shelf being mounted on said shelf mounting means.

6. A cat condominium as described in claim 5, wherein:
    said mounting means comprises a plurality of ledges connected to opposing panels of said cat condominium,
    a plurality of shelves,
    each shelf being mounted on a respective pair of ledges,
    said plurality of shelves forming a plurality of compartments.

7. A cat condominium as described in claim 6, but further characterized by having a plurality of openings in one of said panels providing entrances for cats and kittens to climb into and out of said cat condominium.

8. A method for manufacturing a cat condominium comprising:
    cutting four panels,
    cutting holes in one of the panels for cats to climb,
    attaching mounting means to a pair of said panels,
    placing said panels in a straight line on a work surface, said panels being spaced apart one from another,
    a piece of carpeting placed on said four panels, and
    means for attaching said carpet to said panels, making a plurality of shelves, erecting said panels and with said attached carpet, and inserting said plurality of shelves within said panels, whereby a rigid cat condominium is formed without attaching said panels to each other.

9. A cat condominium as claimed in claim 8 and at least one of said shelves having a cut-out at one of its corners so as to provide for access between adjacent compartments.

10. A collapsible and erectable cat condominium comprising four rectangular equi-dimensioned wall panels, a carpet attached to one face of each panel with said panels being laid out in a row and spaced from one another by a distance equal to their thickness, said carpet extending from the middle of the panel at one end of the row and projecting beyond the last panel of the row a distance equal to one half the width of said last panel plus an amount equal to the thickness of a panel whereby the panels and attached carpet can be folded into an erected condition to form a box-like body, said projecting portion of the carpet being attached to the uncovered portion of the face of the panel that was at said one end of the row,
    a bottom, a plurality of shelves and a top supported within said body so as to define a plurality of superposed compartments and a row of superposed cat accommodating apertures in one panel for providing access to the compartments.

* * * * *